No. 856,488. PATENTED JUNE 11, 1907.
C. L. PEIRCE, Jr.
INSULATOR.
APPLICATION FILED JAN. 29, 1906.
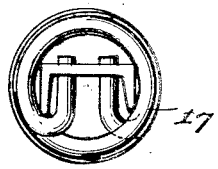
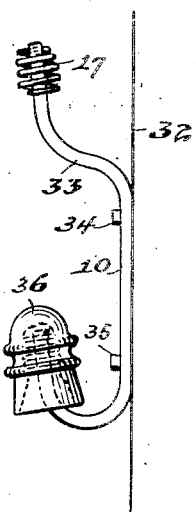
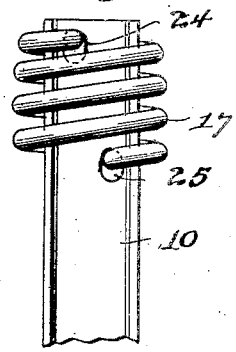
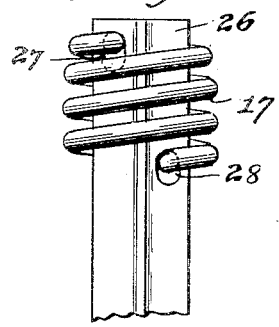
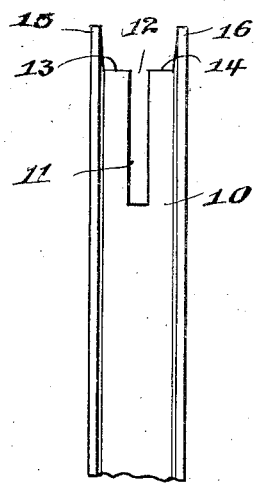
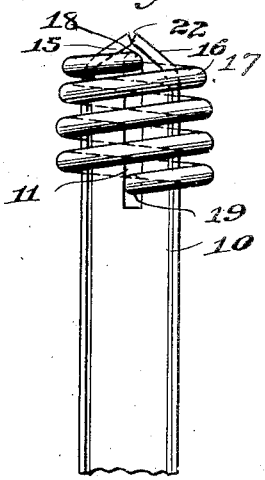
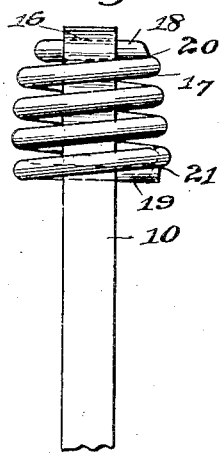
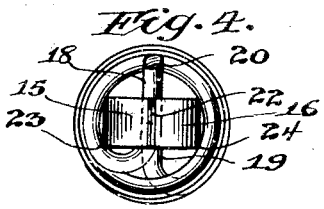
Witnesses,
Inventor;
Charles L. Peirce Jr.
By Offield, Towle and Linthicum.
Attys.

UNITED STATES PATENT OFFICE.

CHARLES L. PEIRCE, JR., OF CHICAGO, ILLINOIS, ASSIGNOR TO PEIRCE SPECIALTY COMPANY, OF CHICAGO, ILLINOIS, A CORPORATION OF ILLINOIS.

INSULATOR.

No. 856,488.  Specification of Letters Patent.  Patented June 11, 1907.

Application filed January 29, 1906. Serial No. 298,474.

*To all whom it may concern:*

Be it known that I, CHARLES L. PEIRCE, Jr., a citizen of the United States, residing at Chicago, in the county of Cook and State of Illinois, have invented certain new and useful Improvements in Insulators, of which the following is a specification.

My invention pertains especially to insulators for telephone and telegraph wires, but it is obvious that it may be employed wherever a conductor for electricity is required, and it consists in the preferred form of a spring member taperingly coiled, and having its ends bent to substantially bisect the interior space of the coil, in combination with a channel bar support, slotted at one end, and within which the bent ends of the spring are run and retained therein by swaging over the open ends of the support.

In the preferred form I construct my support of a channel bar, for the reason that the slot is much easier formed, and the coils of the spring have a bearing upon the edges of the channel bar, thus affording a very strong and durable device, and giving a more uniform shape to the spring. By such a construction I avoid the breaking of a glass insulator, such as are commonly used, as the smaller end of the coiled spring is made somewhat larger than the smaller end of the screw threaded opening in the insulator, so that the insulator may be screwed tight to the support without the end of the support coming in contact therewith.

A further advantage lies in the slot in the support which permits a longitudinal movement of the spring, relative to the support, to counter-act the expansion and contraction of the glass insulator, which variation frequently results in its destruction. Furthermore, when the insulator is screwed on tight the spring is drawn against the top of the slot and compressed so that a vibration of the wire will not loosen the insulator, as the spring automatically adjusts itself to retain its grip upon the insulator.

Other advantages rest in the durability of the structure, and the exceptional cheapness and rapidity with which it can be manufactured, due to the shape of the bracket which permits a ready formation of the aperture and the insertion of the ends of the springs therein.

Referring to the drawing Figure 1 is an elevational view of my device in the preferred form, with one end of the bracket broken away; Fig. 2 is an elevational view of the bracket with one end broken away, and designed to show the longitudinal slot and the ends of the bracket before swaging; Fig. 3 is an edge view of Fig. 1; Fig. 4 is a top view of Fig. 1; Figs. 5 and 6 are modified forms of my device; Figs. 7 and 8 are top views of Figs. 5 and 6 respectively; and Fig. 9 is an elevational view of a double bracket attached to a suitable support.

10 represents a channel bar forming the bracket, capable of being attached to a wall or the like and provided at one end with a slot 11, which is open at one end as shown at 12. The sides of the bracket, in the preferred form, are cut away at 13 and 14 to form the ears 15 and 16 so that the ends may be readily and easily swaged.

17 is a coiled spring slightly tapered, as shown at Fig. 1, and having its ends 18 and 19 bent to bisect the interior space of the coil, said ends resting on the opposite sides of the coil from the bends, as shown at 20 and 21. The spring is then passed over the bracket and forced down upon the same, the ends 18 and 19 sliding within the slot 11 and retained therein by swaging in the ears 15 and 16, as shown at 22, the inner sides of the spring resting upon the edges of the bracket at 23 and 24. In Fig. 5 instead of a slot I provide elongated apertures 24 and 25 which permits the ready insertion of the ends of the spring and also allows a vertical movement of the same, while in Figs. 6 and 8 a T-shaped bar 26 is shown provided with apertures 27 and 28, similar to the apertures in Fig. 5, the spring being coiled about the bar or bracket and supported at its ends 29, 30 and 31. 32 is any suitable support to which the bracket 33 is attached by the nails 34 and 35, and carrying the insulator 36.

I do not claim broadly as my invention the utilization of a spring, as a connecting means between the insulator and a bracket, but

What I claim and wish to secure by Letters Patent is:

1. In combination with an insulator, a bracket formed of a strip provided with an elongated aperture in one of its sides, and a tapered spring coiled around said bracket having one of its ends in said aperture and its sides in contact with the edges of said bracket, substantially as described.

2. In combination with an insulator, a bracket formed of a channel strip and provided with an elongated aperture in one of its sides, and a tapered spring coiled around said bracket having one of its ends in said aperture and its sides in contact with the edges of said bracket, substantially as described.

3. In combination with an insulator, a bracket formed of a channel strip and provided with a slot open at one end, and a tapered spring coiled around said bracket, having its ends within said aperture, and retained therein by swaging over the ends of said bracket, substantially as described.

4. In combination with an insulator, a bracket formed of a channel strip and provided with an elongated aperture in one of its sides, and a tapered spring coiled around said bracket and having its ends bent to substantially bisect the interior space of said spring, said ends being adapted to slide within said aperture, and retained therein by swaging over the ends of said bracket, substantially as described.

5. In combination with an insulator, a bracket formed of a channel strip and provided with an elongated aperture in one of its sides, and with cut away portions in the sides of said bracket to form ears, and a tapered spring coiled around said bracket, having its ends within said aperture, and retained therein by swaging over the ears on said bracket, substantially as described.

6. In combination with an insulator, a bracket formed of a channel strip and provided with an elongated aperture in one of its sides, open at one end, a tapered spring coiled around said bracket and provided with inturned ends, said ends being adapted to slide within said aperture and retained therein by swaging over the outer end of said bracket, substantially as described.

CHARLES L. PEIRCE, Jr.

Witnesses:
 FREDERICK C. GOODWIN,
 JAMES R. OFFIELD.